UNITED STATES PATENT OFFICE.

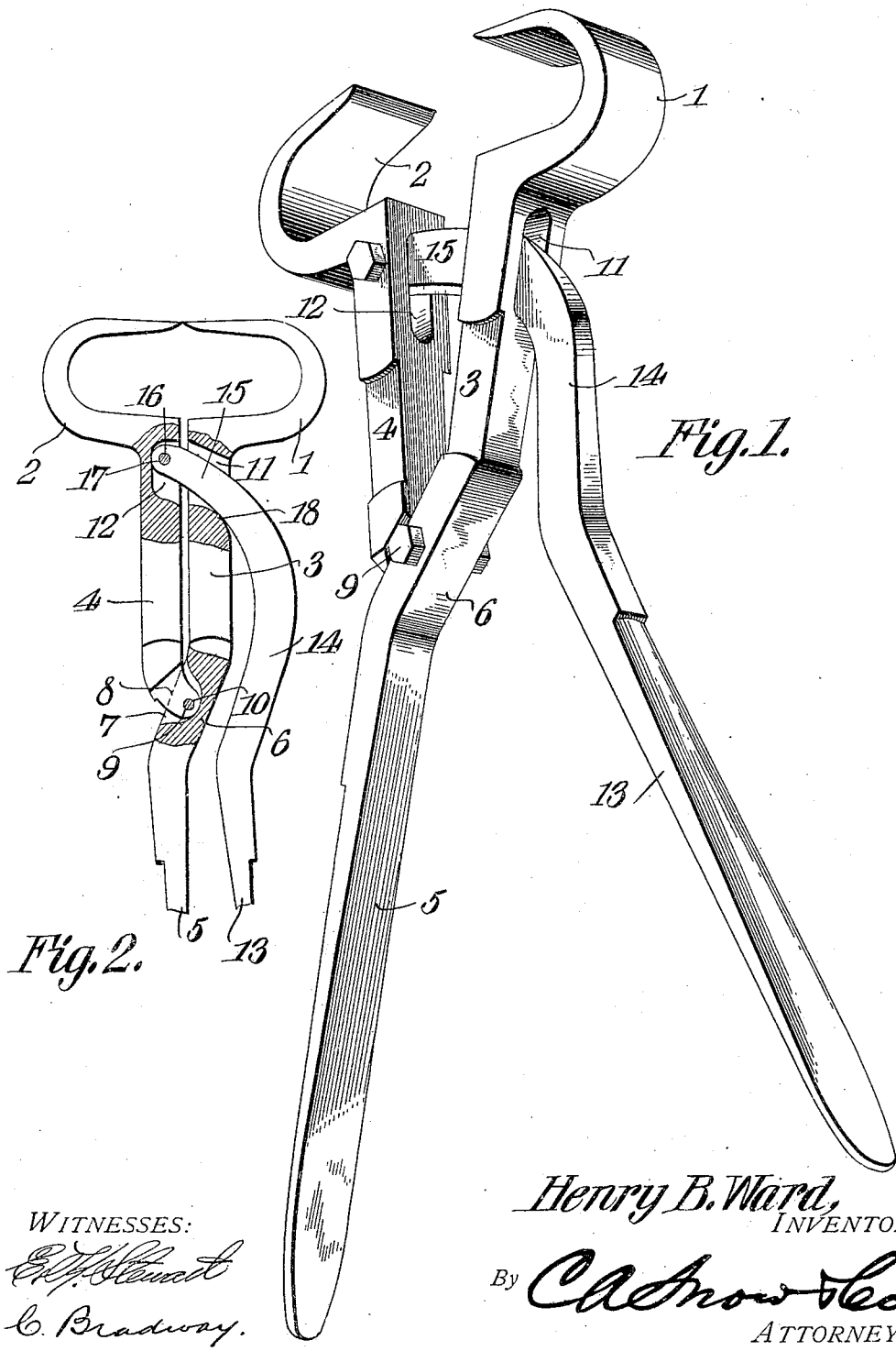

HENRY B. WARD, OF NAMPA, IDAHO.

HOOF-NIPPERS.

No. 838,597.   Specification of Letters Patent.   Patented Dec. 18, 1906.

Application filed July 27, 1906. Serial No. 328,111.

*To all whom it may concern:*

Be it known that I, HENRY B. WARD, a citizen of the United States, residing at Nampa, in the county of Canyon and State of Idaho, have invented new and useful Hoof-Nippers, of which the following is a specification.

The present invention relates to improvements in hoof-nippers, pliers, pincers, and the like of that type in which one of the jaws is hinged on the other jaw which is provided with a handle and the jaws are opened and closed by aid of an independent handle so arranged as to include a power-multiplying device whereby the shearing or gripping power can be increased.

The invention has for its objects to provide an implement of this character which is of simple and inexpensive construction and is composed of few parts so arranged as to permit of a great power being obtained at the jaws with relatively little effort on the part of the operator and to produce a substantial implement.

With these objects in view and others, as will appear as the nature of the invention is better understood, the invention comprises the various novel features of construction and arrangement of parts, which will be more fully described hereinafter and set forth with particularity in the appended claims.

In the accompanying drawings, which illustrate one of the embodiments of the invention, Figure 1 is a perspective view of the implement shown with the jaws open. Fig. 2 is a plan view of the implement on a smaller scale, showing portions broken away and the jaws closed.

Corresponding parts in both figures are indicated throughout by similar characters of reference.

In the present illustration I have shown the invention applied as a pair of nippers or trimmers; but I desire it, however, to be understood that I am not necessarily limiting the invention to this use.

Referring to the drawings, 1 and 2 designate the hook-shaped jaws of the nippers, which are respectively provided with shanks 3 and 4, the shank 3 being prolonged into a handle 5. Intermediate the shank 3 and handle 5 is an oblique or inclined connecting portion 6, which is provided with a socket or slot 7, open at one side to receive the tongue or reduced extremity 8 at the lower end of the shank 4, the two shanks being hinged together by the pivot-bolt 9, passing through registering apertures 10 in the tongue 8 and walls of the socket 7. The extremity 8 of the shank 4 is bent in a line crossing the connecting portion 6, so that when the jaws are closed, as shown in Fig. 2, the shanks 3 and 4 are substantially parallel.

Adjacent the upper end of the shank 3 is a transverse opening 11, disposed with its axis in the plane of movement of the jaws, and in the wall of the shank 4, presented to the opening 11, is a slot or socket 12, having its open end registering with and presented to the inner end of the opening 11. Arranged at the side of the shank 3 opposite from the shank 4 is an independent handle 13, whose shank 14 curves inwardly across the shank 3 and is pivotally attached to the shank 4, and the curved portion extends through the opening 11 into the slot 12. The upper end of the curved portion 15 of the handle 13 is apertured, as at 16, Fig. 2, to receive a pivot-bolt 17, whereby the handle is securely attached to the shank 4. The curved portion 15 extends loosely through the opening 11 and is adapted to have a wiping engagement with the bottom wall 18 of the latter, which is curved, as shown in Fig. 2, to the general curvature of the portion 15. By this arrangement a mechanism in the nature of a cam is employed, whereby the jaw 2 is moved by the curved portion 15 sliding along the wall 18. The construction is such that power applied to the ends of the handles 5 and 13 for closing the jaws is multiplied to any desired extent, depending upon the curvature of the parts included in the cam arrangement.

I have described the principle of operation of the invention, together with the device which I now consider to be the best embodiment thereof; but I desire to have it understood that the device shown is merely illustrative and that various changes may be made, when desired, that are within the scope of the invention.

What is claimed is—

1. An implement of the class described, comprising a jaw having a shank and a handle, a jaw having a shank hinged to the first shank, and a second handle extending across the shank of the first jaw and hinged at its end to the shank of the second jaw at a point on the shank intermediate the hinge thereof and the jaw and coöperating with the shank of the first jaw to open and close the jaws.

2. An implement of the class described comprising a jaw provided with a handle, and a shank having a cam-shaped wall, a second jaw having a shank hinged on the first, a single-piece handle hinged on the shank of the second jaw and provided with a curved portion having a sliding contact with and engaging said wall to produce relative movement of the jaws.

3. An implement of the class described comprising a jaw having a shank apertured adjacent the jaw, a handle connected with the shank, a jaw having its shank hinged to the shank of the first, and a handle passing movably through the aperture of the first shank and pivotally connected at one end to the second shank.

4. An implement of the class described comprising a jaw having an apertured shank and a handle, a jaw having a slotted shank, a hinged connection between the shanks of the jaws, and a handle which engages in the aperture of one shank and is pivoted in the slot of the other shank.

In testimony that I claim the foregoing as my own I have hereto affixed my signature in the presence of two witnesses.

HENRY B. WARD.

Witnesses:
WILLIAM STRODE,
C. E. LEE.